United States Patent [19]

Raghavan et al.

[11] Patent Number: 5,272,661
[45] Date of Patent: Dec. 21, 1993

[54] FINITE FIELD PARALLEL MULTIPLIER

[75] Inventors: Sreenivasa A. Raghavan, La Jolla; Yoav Hebron, San Diego; Itzhak Gurantz, San Diego; James N. Esserman, San Diego, all of Calif.

[73] Assignee: ComStream Corporation, San Diego, Calif.

[21] Appl. No.: 990,524

[22] Filed: Dec. 15, 1992

[51] Int. Cl.[5] .............................................. G06F 7/00
[52] U.S. Cl. .................................................. 364/746.1
[58] Field of Search ....................... 364/746.1, 754, 757

[56] References Cited

U.S. PATENT DOCUMENTS

| 4,037,093 | 7/1977 | Gregg et al. ................ 235/164 |
| 4,918,638 | 4/1990 | Matsumoto et al. ........... 364/746.1 |
| 5,046,037 | 9/1991 | Cognault et al. ............. 364/746.1 |

OTHER PUBLICATIONS

C. C. Wang et al., "VLSI Architectures for Computing Multiplications and Inverses in GF ($2^M$)." IEEE Trans. on Computers, vol. C-34, No. 8, pp. 709-717, Aug. 1985.
M. Morii et al., "Efficient Bit-Serial Multiplication and the Discrete-Time Wiener-Hopf Equation Over Finite Fields." IEEE Trnas. on Inform. Theory, vol. 35, No. 6, pp. 1177-1183, Nov. 1989.
E. R. Berlekamp, "Bit-Serial Reed-Solomon Encoders." IEEE Trans. on Inform. Theory, vol. IT-28, No. 6, pp. 869-874, Nov. 1982.
P. A. Scott et al., "A Fast VLSI Multiplier for GF ($2^M$)." IEEE Journal on Selected Areas in Communications, vol. Sac-4, No. 1, pp. 62-65, Jan. 1986, plus additional 7 pages.

Primary Examiner—Tan V. Mai
Attorney, Agent, or Firm—Robert M. Asher

[57] ABSTRACT

A finite field parallel multiplier in GF($q^m$) including a router for directing $2m-1$ components in m groups of m single-component signal lines towards m computing circuits for performing multiply and add modulo-q. The router guides m components from a first finite field element along with an additional $m-1$ components generated from linear combinations of the m components of the first finite field element. Each of the computing circuits receives all of the components from the second finite field element and m components provided by one set of signal lines through the router. Each computing circuit generates a single component for the resultant finite field element. These resulting components may be input through a basis change circuit to obtain a result in the desired basis.

29 Claims, 8 Drawing Sheets

FINITE FIELD PARALLEL MULTIPLIER

BACKGROUND OF THE INVENTION

The present invention is directed to a finite field parallel multiplier. Multiplication of two elements in a finite field is needed in many applications including algebraic encoding and decoding of block codes, digital signal processing, pseudo-random number generation, and cryptographic protocols. A Reed-Solomon encoder and a Reed-Solomon decoder of the present invention make use of these finite field parallel multipliers.

Operations on finite field $GF(q^m)$ elements such as multiplication of one element by another element are well-known in the art. An element of $GF(q^m)$ is comprised of m components, each component having one of q possible values. Multiplication of two elements in a finite field can be done either serially or in parallel In a serial multiplier, the result of multiplication of two elements is obtained in multiple clock cycles (typically, m clock cycles). In a parallel multiplier the result of multiplication of two elements can be obtained in a single clock cycle. Thus, parallel multipliers are very useful when a high-speed implementation of an application is necessary. One implementation of a serial multiplication circuit can be found in E. R. Berlekamp, "Bit-Serial Reed-Solomon Encoders," *IEEE Transactions on Information Theory*, Vol. IT-28, No. 6, pp. 869-874, November 1982 Berlekamp discloses a multiplier circuit that is used m times to obtain the final product of two finite field elements. In the Berlekamp method, one of the elements is transformed from a standard basis to a dual basis before the multiplication can proceed. An improvement upon Berlekamp's method is disclosed in M. Morii et al., "Efficient Bit-Serial Multiplication and the Discrete-Time Weiner-Hopf Equation over Finite Fields," *IEEE Transactions on Information Theory*, Vol. 35, No. 6, pp. 1177-1183, November 1989 Morii et al. showed that there exist an entire set of bases that can be substituted for the dual basis used by Berlekamp.

The implementation of a parallel multiplier has required many times the number of gates than a serial multiplier. One implementation of a parallel multiplier can be found in C. W. Wang et al., "VLSI Architectures for Computing Multiplications and Inverses in $GF(2^m)$," *IEEE Transaction on Computers*, Vol C-34, No. 8, pp. 709-717, August 1985. In the Wang et al. implementation, m function circuits each receive the same components from the two finite field elements differing in only that they have been shifted. The algorithm used by Wang et al. requires a large number of gates in the function circuits to determine the end result.

It is an object of the present invention to perform finite field multiplication in a single clock cycle. It is a further object of the present invention to provide a finite field multiplier that requires relatively few gates.

SUMMARY OF THE INVENTION

A finite field parallel multiplier of the present invention multiplies a first finite field element by a second finite field element in $GF(q^m)$. The two elements are in different bases. If they are provided in the same basis, a basis transformation circuit is included. A processing circuit is provided to generate, in parallel, m−1 additional components from the m components of the first finite field element. A router takes the m components of the first finite field element and the generated m−1 components and routes them in m groups of m single-component signal lines each. M computing circuits are provided in parallel for performing the same multiply and add modulo-q operation on one of the groups of m single-component lines and all of the components from the second finite field element. Each of the circuits outputs a single component which when considered together provide the end result finite field element in the basis of the first finite field element. A basis transformation may be performed on the resultant finite field element to put it in a desired basis.

A finite field parallel multiplier of the present invention can be simplified in a situation where a constant finite field element is repeatedly used in multiplication with variable input finite field elements. The variable finite field element is provided in a predefined basis or is transformed into the predefined basis. An additional m−1 components are generated in parallel from the variable finite field element in the predefined basis. The router is the same as above but since there is no need for a signal where the corresponding constant finite field element component is zero, not all m signal component lines of the variable finite field element are needed in each group. Therefore, each group of signal lines from the router has at most m signal lines. The m computing means are particularly adapted for performing the multiply and add modulo-q given the known constant finite field element Conversely, the constant finite field element may be provided in the predefined basis and expanded to 2m−1 ordered components. These components set the signal values of each signal line in m subsets of at most m signal lines. A signal line is not needed for zero components. The m subsets are provided to m computing circuits each adapted to perform the multiply and add modulo-q operation on the variable finite field element with respect to the subset it receives.

Other objects and advantages of the present invention will become apparent during the following description of the presently preferred embodiment of the invention taken in conjunction with the drawings.

DETAILED DESCRIPTION OF THE PREFERRED EMBODIMENTS

Figure 1:
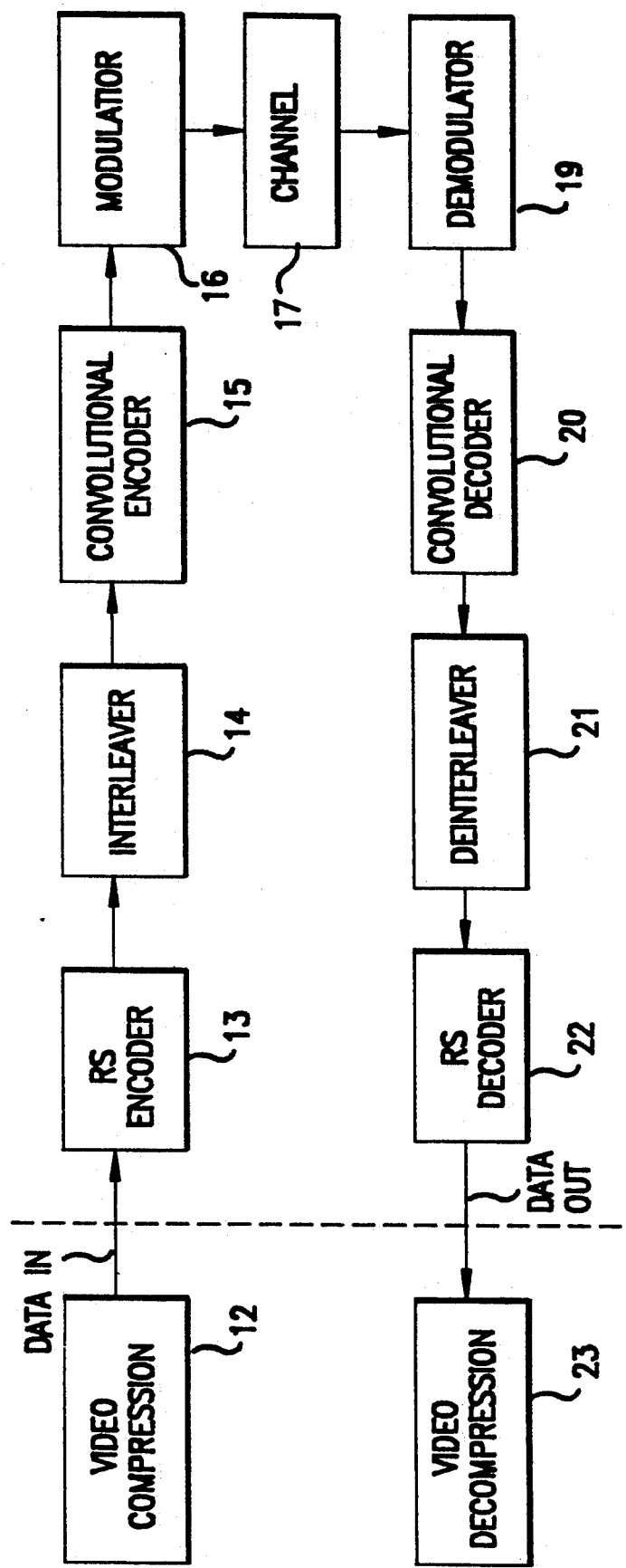
FIG. 1 is a basic block diagram of a communications system of the prior art.

A prior art block diagram of a communication system that uses Reed-Solomon encoded messages is shown in FIG. 1. An input video signal is provided to a video compression circuit 12 for processing. The resulting compressed video data signal is fed to a Reed-Solomon encoder 13, an interleaver 14, a convolutional encoder 15 and a modulator 16 in succession. The output of the modulator 16 is transmitted over a channel 17. At the receiving end, Reed-Solomon encoded messages transmitted over the channel 17 are decoded. The receiver includes a demodulator 19, a convolutional decoder 20, a deinterleaver 21 and a Reed-Solomon decoder 22 in succession. The decoded output from the Reed-Solomon decoder 22 is provided to a video decompression circuit 23.

Figure 2:
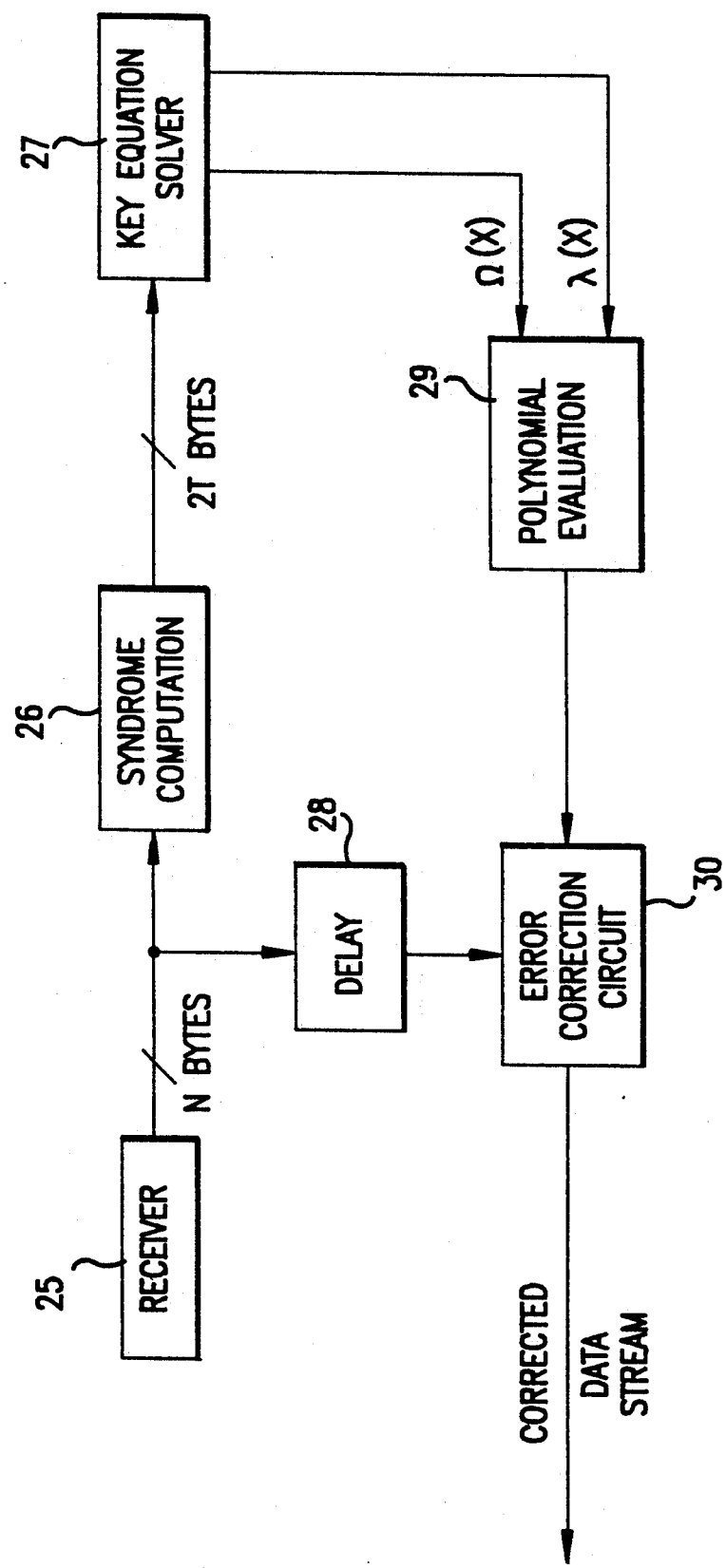
FIG. 2 is a basic block diagram of a Reed-Solomon decoder of the prior art.

The finite field parallel multipliers of the present invention may be substituted for conventional finite field multipliers in various components of the prior art communication system, including the Reed-Solomon encoder 13 and the Reed-Solomon decoder 22. While many applications are possible for the finite field parallel multipliers of the present invention, we only elaborate upon the Reed-Solomon decoder 22 here with respect to FIG. 2. A receiver 25 accepts the deinterleaved data. This data is provided both to a syndrome computation circuit 26 and a delay circuit 28. The syndrome computation circuit 26 computes a syndrome polynomial from the Reed-Solomon coded messages The syndrome polynomial is provided to a key equation solver circuit 27 where an error locator polynomial and an error evaluator polynomial are generated. The delay circuit 28 delivers delayed received messages to an error correction circuit 30. Circuit 27 delivers the error-locator polynomial and the error-evaluator polynomial to a polynomial evaluator circuit 29 were the values of the two polynomials are calculated. The results of the polynomial evaluator circuit are passed to an error correction circuit 30 which corrects errors in the received Reed-Solomon coded messages based upon these results and outputs the corrected data.

In accordance with the present invention, the Reed-Solomon decoder of the prior art is modified to include finite field parallel multipliers as described below. Finite field multipliers are used in at least the syndrome computation 26, the key equation solver 27 and the polynomial evaluation circuit 29. The multipliers used may include those which multiply two variable finite field elements and those which multiply a variable finite field element by a constant finite field element. Any of these may be replaced by one of the finite field parallel multipliers of the present invention described below. By using the present invention the decoder can be made to run faster without a large increase in the amount of real estate occupied.

Figure 3:
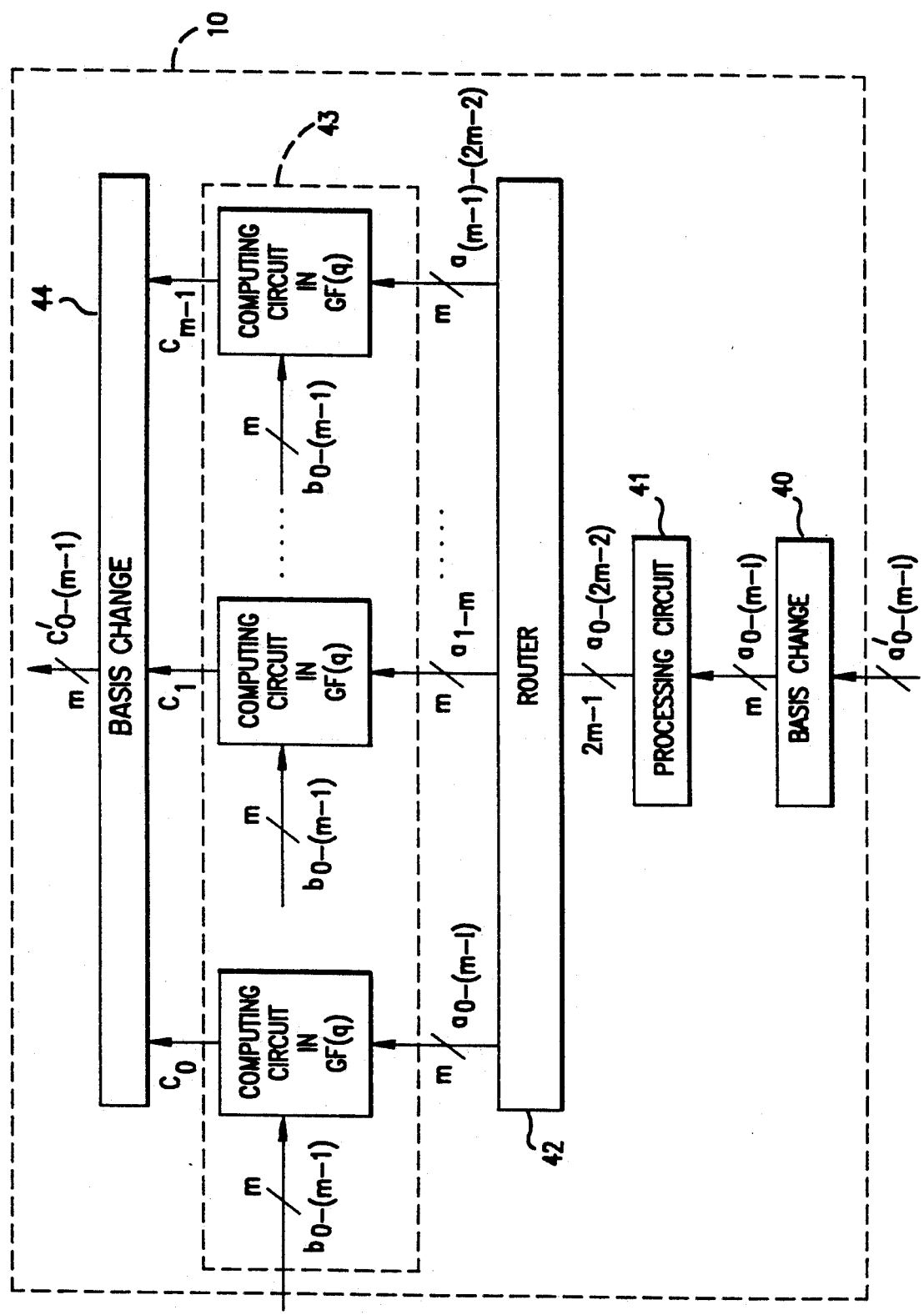
FIG. 3 is a basic block diagram of a finite field parallel multiplier of the present invention.

Any element in a finite field $GF(q^m)$ can be represented by an m-tuple, whose components are elements of the base field $GF(q)$. In the particular case of $GF(2^m)$, the elements can be represented by binary m-tuples. The parallel finite field multiplier 10 of the present invention as shown in FIG. 3 is provided for multiplying two elements labeled a and b in $GF(q^m)$. It should be recognized that the same finite field element can be represented by one of several m-tuple representations depending upon the basis selected for representation of the elements in the finite field. The present invention makes use of the bit serial multiplication algorithm taught in E. R. Berlekamp, "Bit-Serial Reed-Solomon Encoders," IEEE Transactions on Information Theory, Vol. IT-28, No. 6, pp. 869-874, November 1982, and expanded upon in M. Morii et al., "Efficient Bit-Serial Multiplication and the Discrete-Time Weiner-Hopf Equation over Finite Fields," IEEE Transactions on Information Theory, Vol. 35, No. 6, pp. 1177-1183, November 1989. The disclosures of these two publications are hereby incorporated by reference herein.

The present invention makes use of the commonly used Berlekamp bit serial multiplication algorithm. In order to make use of these circuit components, one of the multiplication factors is represented in polynomial basis. The polynomial basis is also known as a standard basis based upon the primitive polynomial. In accordance with Berlekamp the other multiplication factor needs to be represented in the dual basis of the polynomial basis. However, M. Morii et al taught that there were actually 255 available bases in $GF(2^8)$ that may be selected as being amenable to efficient bit serial multiplication. For the purposes of the present application, we define any of the $q^m-1$ bases taught by M. Morii et al. for use in bit serial multiplication as a D-basis. Thus, when both multiplication elements are provided in standard basis, one of them must be changed to one of the D-bases by using a basis change circuit 40. We identify the element changed into the predetermined D-basis as element a. It is recommended that a D-basis be selected so as to make the basis change circuit 40 as simple as possible with as few gates as possible.

In Berlekamp's implementation of the multiplier, the element a (in dual basis) is loaded into a feedback shift register whose connections are given by the coefficients of the primitive polynomial p(x). So in each clock cycle, the contents of the feedback shift register are multiplied and added modulo-q with the m components of b to produce a single component of c in dual basis. Also during the clock cycle the contents of feedback shift register are shifted to left by one position and a newly computed component takes the last position of the feedback shift register. The process continues for m clock cycles, until all the components of c are generated.

In accordance with the implementation of the present invention, the newly computed components, herein designated the additional m−1 a components, are generated all at once in parallel by a processing circuit 41. A description of the processing performed by the processing circuit 41 is described as follows. It is assumed that the primitive polynomial of $GF(q^m)$ is given by $$p(x) = p_0 + p_1 x + p_2 x^2 + \ldots + p_m x^m \qquad (1)$$

The coefficients of p(x), $\{p_i; i=0, 1, \ldots m\}$ are elements of GF(q). We compute the elements $\{a_m; a_{m+1}, \ldots, a_{2m-2}\}$ by utilizing the components of a, namely $\{a_0, a_1, \ldots, a_{m-1}\}$ and $\{p_0, p_1, \ldots, p_m\}$ by using the following:

$$a_{i+m} = \{(f_{i0} \wedge a_0) \oplus (f_{i1} \wedge a_1) \oplus \ldots \\ \oplus (f_{i,m-1} \wedge a_{m-1})\} \text{modulo } q; \qquad (2)$$

for $i = 0, 1, 2 \ldots (m-2)$ where the coefficients $\{f_{ij}; i=0, 1, \ldots, m-2 \text{ and } j=0, 1, \ldots, m-1\}$ are found by using $$f_{0j} = p_j; \ 0 \leq j \leq (m-1) \qquad (3)$$

$$f_{i,-1} = 0; \ 0 \leq i \leq (m-2)$$

and $$f_{i+1,j} = f_{i,j-1} \oplus \{f_{i,m-1} \wedge p_j\}; \ 0 \leq i \leq (m-3) \qquad (4)$$

where the symbol $\oplus$ represents modulo-q addition and the symbol $\wedge$ represents modulo-q multiplication of two elements in GF(q). In the special case of $q=2$, the operation ⊕ is equivalent to logical XOR operation of two binary numbers and the operation Λ is equivalent to logical AND operation of two binary numbers.

The above mathematics can be written in words as either of two algorithms. The processing circuit 41 is designed to take the original m components of finite field element a and generate results corresponding to the m−1 additional components. The processing circuit 41 need not actually perform the steps of any of the two alternative algorithms. It is preferable in accordance with the present invention that the results generated be the same as if one of the algorithms was used but that instead of serially proceeding through the steps the processing circuit 41 directly produces the m−1 components from the original m components simultaneously through parallel paths. A first alternative algorithm is as follows:

a) multiplying modulo-q each coefficient of the primitive polynomial of GF($q^m$) by a corresponding component in the finite field element a to produce m products;

b) adding modulo-q all of the m products to generate one of the m−1 components;

c) deleting the least significant component of finite field element a, shifting the remaining components of finite field element a down one location and inserting the generated one of said m−1 components into the most significant location to produce a new finite field element;

d) replacing the finite field element a with the new finite field element and repeating steps a, b, c and d until all m−1 components have been generated.

The same results for the m−1 components can be obtained by performing the steps of the alternative algorithm as follows:

a) multiplying modulo-q each component of finite field element a by a corresponding coefficient in a primitive polynomial of GF($q^m$) to produce m products;

b) adding modulo-q all of the m products to generate one of the m−1 components;

c) deleting the most significant coefficient of the primitive polynomial of GF($q^m$), shifting the remaining coefficients of the primitive polynomial of GF($q^m$) up one location and inserting zero into the least significant location to produce a new polynomial;

d) multiplying modulo-q each coefficient of the primitive polynomial of GF($q^m$) by the deleted most significant coefficient to produce a second polynomial;

e) adding modulo-q each coefficient of the new polynomial to a correspondingly located coefficient in the second polynomial to produce a third polynomial;

f) replacing the coefficients of said primitive polynomial of GF($q^m$) in steps (a) and (c) but not (d) with the coefficients of the third polynomial and repeating steps a,b,c,d,e and f until all m−1 components have been generated.

Further in accordance with the present invention, a router 42 is used to distribute the original m components of element a and the computed m−1 components obtained from the processing circuit 41. Taking the original m components and the additional m−1 components in order, the router 42 routes the components into m groups of m single-component signal lines each. Each group of signal lines is shifted in order from one of the other sets beginning with the original collection of elements $a_0$ through $a_{m-1}$. The router 42 is a fixed set of conductors guiding the components of finite field element a and the processed m−1 components in m groups to m computing circuits 43. The computing circuits 43 each perform the same multiply and add operation in GF(q). Each computing circuit multiplies modulo-q each of the components of the second finite field element b. The components of finite field element b are matched up in order with the single components of the group in accordance with their order to perform the multiplying. The results of the multiplications performed in one of the computing circuits are added modulo-q in that computing circuit. Each computing circuit outputs a single component resulting from the modulo-q addition. Together the components output by the m computing circuits 43 comprise a resultant finite field element c. The resultant finite field element c determined as described above satisfies the equation:

$$c_i = (b_0 \Lambda a_i) \oplus (b_1 \Lambda a_{i+1}) \oplus \ldots \oplus (b_{m-1} \Lambda a_{i+m-1}); \quad 0 \leq i \leq (m-1). \tag{5}$$

The result thus obtained is in the D-basis selected to represent the element a. In order to return the element c to any alternate basis such as the standard basis, a basis change circuit 44 would be required.

As an example of the present invention, we now describe in greater detail a finite field parallel multiplier implemented in accordance with the present invention for elements in GF($2^8$). A primitive polynomial of the field, p(x) is assumed to be $$p(x) = 1 + x^2 + x^3 + x^4 + x^8. \tag{6}$$

Since the base field GF(2) has only two elements in it, the operation Λ is equivalent to logical XOR operation of two binary numbers and the operation Λ is equivalent to logical AND operation of two binary numbers. A matrix F is determined by p(x) in accordance with equations (3), (4) and (6) as follows:

$$F = \begin{bmatrix} f_{00} & f_{01} & f_{02} & f_{03} & f_{04} & f_{05} & f_{06} & f_{07} \\ f_{10} & f_{11} & f_{12} & f_{13} & f_{14} & f_{15} & f_{16} & f_{17} \\ f_{20} & f_{21} & f_{22} & f_{23} & f_{24} & f_{25} & f_{26} & f_{27} \\ f_{30} & f_{31} & f_{32} & f_{33} & f_{34} & f_{35} & f_{36} & f_{37} \\ f_{30} & f_{41} & f_{42} & f_{43} & f_{44} & f_{45} & f_{46} & f_{47} \\ f_{50} & f_{51} & f_{52} & f_{53} & f_{54} & f_{55} & f_{56} & f_{57} \\ f_{60} & f_{61} & f_{62} & f_{63} & f_{64} & f_{65} & f_{66} & f_{67} \end{bmatrix} = \tag{7}$$

$$\begin{bmatrix} 1 & 0 & 1 & 1 & 1 & 0 & 0 & 0 \\ 0 & 1 & 0 & 1 & 1 & 1 & 0 & 0 \\ 0 & 0 & 1 & 0 & 1 & 1 & 1 & 0 \\ 0 & 0 & 0 & 1 & 0 & 1 & 1 & 1 \\ 1 & 0 & 1 & 1 & 0 & 0 & 1 & 1 \\ 1 & 1 & 1 & 0 & 0 & 0 & 0 & 1 \\ 1 & 1 & 0 & 0 & 1 & 0 & 0 & 0 \end{bmatrix}$$

Figure 4:
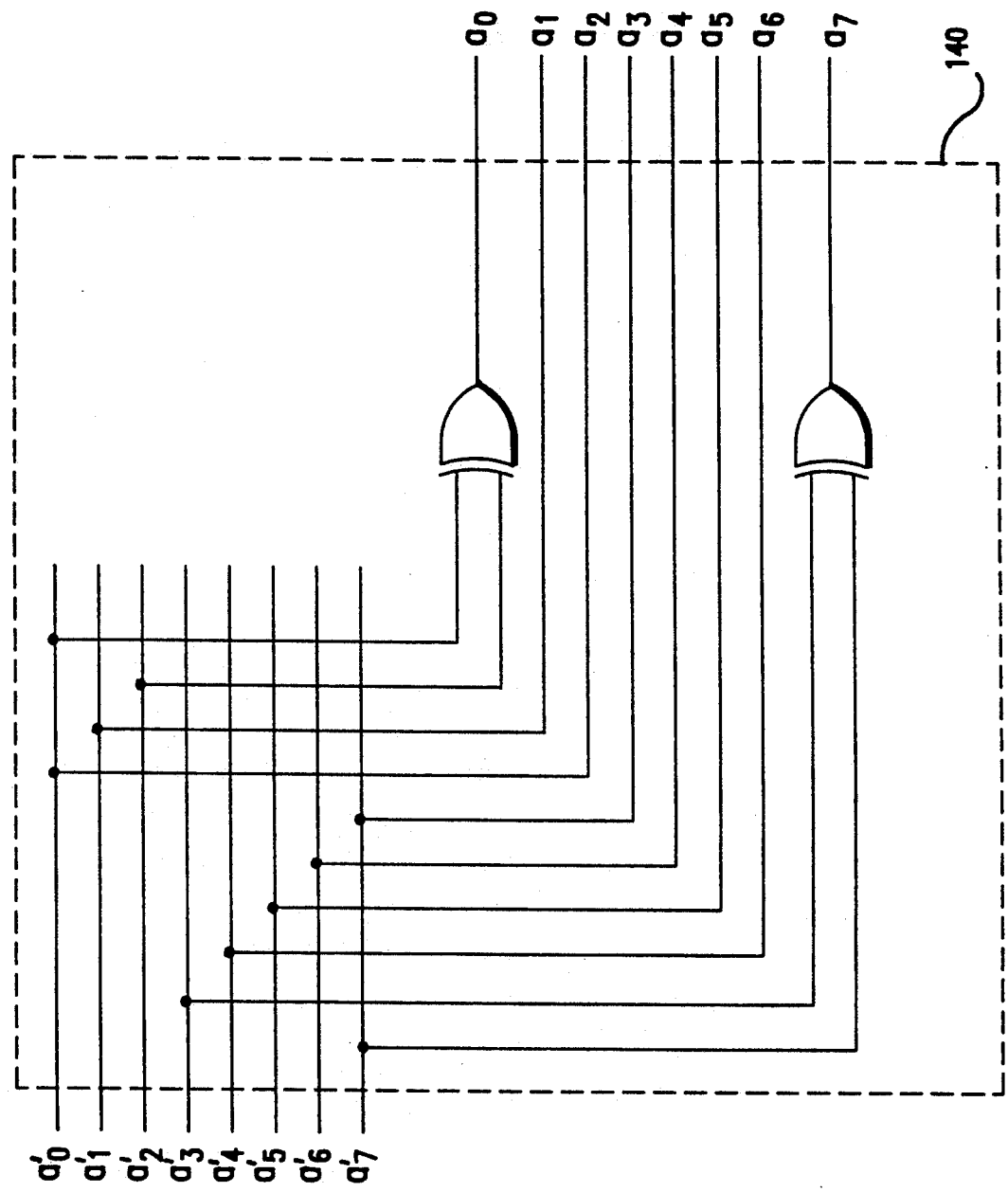
FIG. 4 is a schematic diagram of an input basis change circuit of the multiplier of FIG. 3 for $GF(2^8)$.

In accordance with the present preferred embodiment, a basis conversion circuit 140 for use in GF($2^8$) is shown in FIG. 4. The input to the basis conversion circuit 140 is (a'$_0$, a'$_1$, ..., a'$_7$), the eight-bit polynomial basis representation of the finite field element a. The output is ($a_0$, $a_1$, ..., $a_7$), the eight-bit representation of the finite field element a in the D-basis selected as discussed above. The circuit accomplishes this basis conversion by using the relationships $$\begin{aligned} a_0 &= a_0' \text{ XOR } a_2' \\ a_1 &= a_1' \\ a_2 &= a_0' \\ a_3 &= a_7' \\ a_4 &= a_6' \\ a_5 &= a_5' \end{aligned} \tag{8}$$

-continued $a_6 = a_4'$
$a_7 = a_3' \, XOR \, a_7'$.

This preferred basis conversion circuit thus advantageously requires only two XOR gates. There is one XOR gate to generate $a_0$ and another XOR gate to generate $a_7$.

Figure 5:
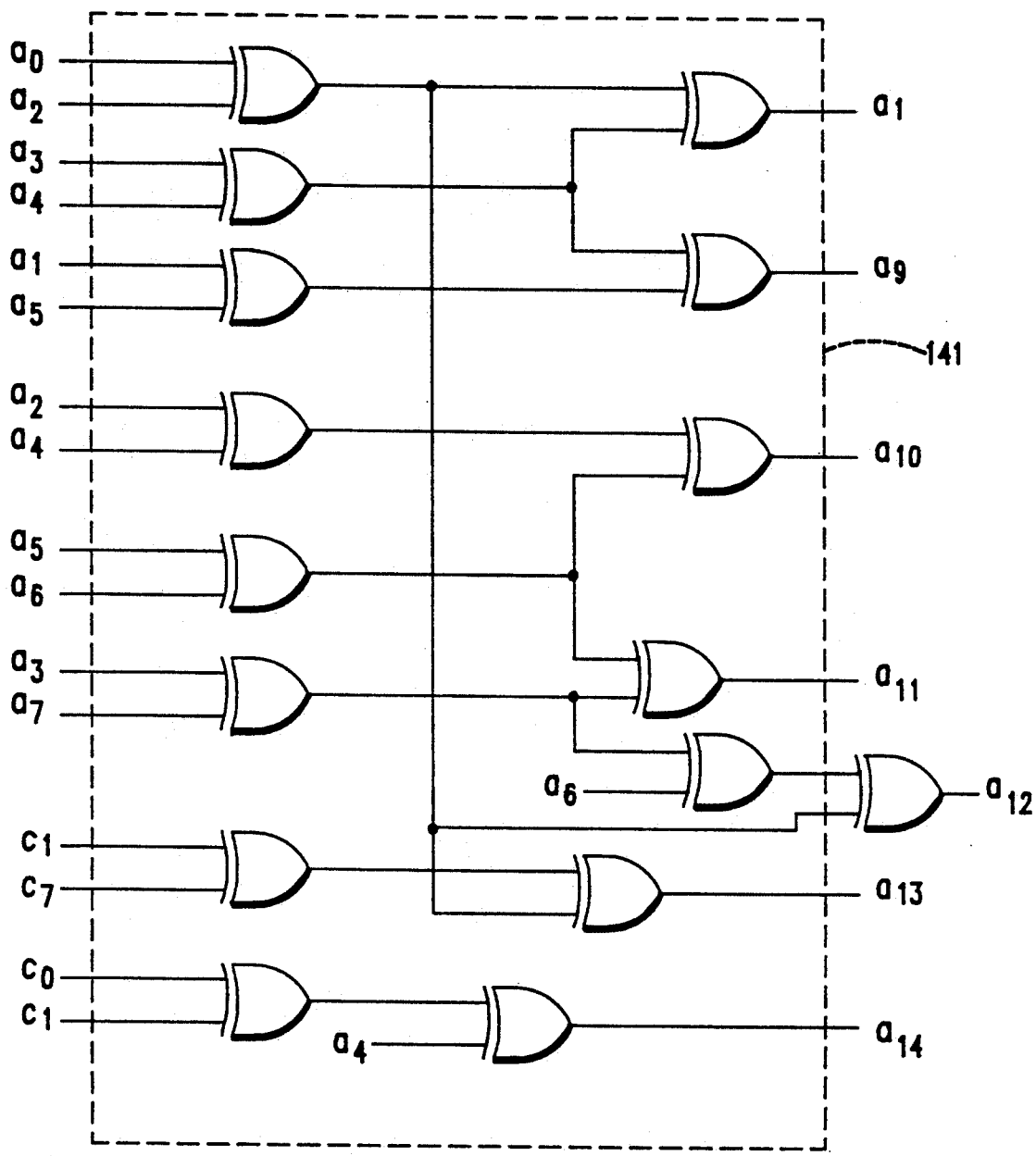
FIG. 5 is a schematic diagram of the processing circuit of the multiplier of FIG. 3 for $GF(2^8)$.

A processing circuit 141 for generating the additional 7 components for the GF($2^8$) multiplier embodiment is shown in detail in FIG. 5. The matrix F given above sets forth the algorithm for generating the additional $m-1$ components. That is the following logical relationships are implemented by this circuit $a_8 = (a_0 \, XOR \, a_2) \, XOR \, (a_3 \, XOR \, a_4)$    (9)
$a_9 = (a_3 \, XOR \, a_4) \, XOR \, (a_1 \, XOR \, a_5)$
$a_{10} = (a_2 \, XOR \, a_4) \, XOR \, (a_5 \, XOR \, a_6)$
$a_{11} = (a_5 \, XOR \, a_6) \, XOR \, (a_3 \, XOR \, a_7)$
$a_{12} = (a_0 \, XOR \, a_2) \, XOR \, (a_3 \, XOR \, a_7) \, XOR \, a_6$
$a_{13} = (a_0 \, XOR \, a_2) \, XOR \, (a_1 \, XOR \, a_7)$
$a_{14} = (a_0 \, XOR \, a_1) \, XOR \, a_4$.

This implementation exploits the symmetry in the processing matrix F and implements the processing circuit 141 with only sixteen two-input XOR gates, as shown in FIG. 5.

A router 142 for GF($2^8$) is used to select eight sets of eight bits each from the total number of fifteen bits including the original $a_0$-$a_7$ and the generated bits $a_8$-$a_{14}$. A first set of bits is taken from the first eight bits, $a_0$-$a_7$ obtained from the basis conversion circuit 140. Each successive group of bits is taken by shifting the set over one at a time to bits $a_1$-$a_8$, and $a_2$-$a_9$, etc. For example, in the first two sets both sets include the bits $a_1$-$a_7$ the remaining bit is $a_0$ in the first set and $a_8$ in the second set.

Figure 6:
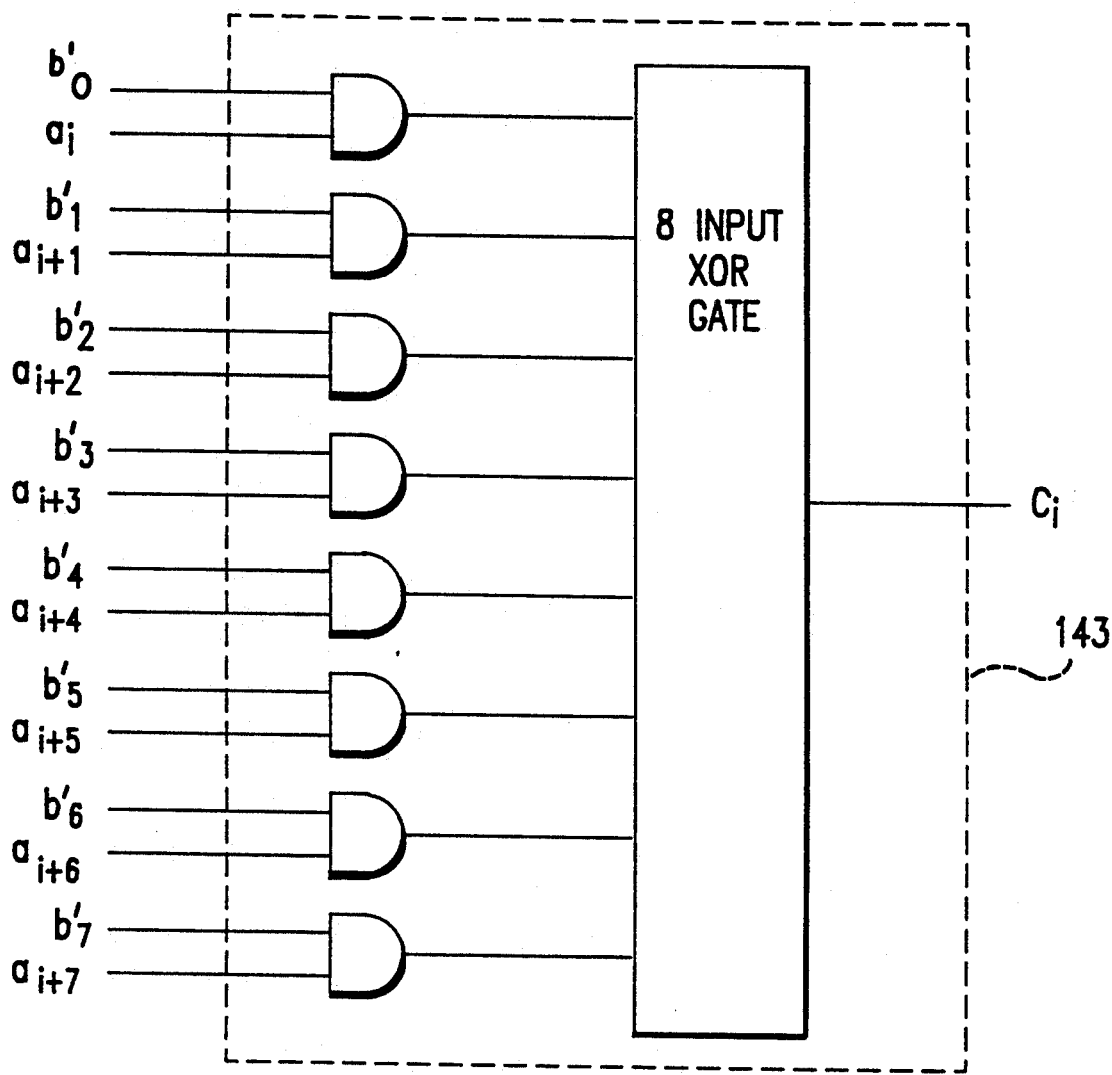
FIG. 6 is a schematic diagram of the computing circuits of the multiplier of FIG. 3 for $GF(2^8)$.

Each computing circuit 143 generates one of the components of the resulting finite field element in the predetermined D-basis. The computing circuit 143 that generates $c_i$ has two eight-bit input words namely ($a_i$, $a_{i+1}$, ..., $a_{i+7}$) and ($b_0$, $b_1$, ..., $b_7$). The computing circuit 143 for use in the GF($2^8$) embodiment is shown in FIG. 6. The computing circuit 143 includes eight two-input logical AND gates and an eight-input logical XOR gate. It can be seen that the inputs to the j th AND gate are $b_j$ and $a_{i+j}$, $j=0, 1, \ldots, 7$, where i refers to the i th circuit 143 used to generate the i th component of the resultant finite field element $c_i$ in the predetermined D-basis. The outputs from the eight AND gates are the inputs to an eight-input XOR gate. The output of the eight-input XOR gate is the bit for the i th component of the resultant finite field element in the predetermined D-basis. All of the computing circuits 143 used in parallel in the invention are identical thereby simplifying the fabrication of the circuitry.

Figure 7:
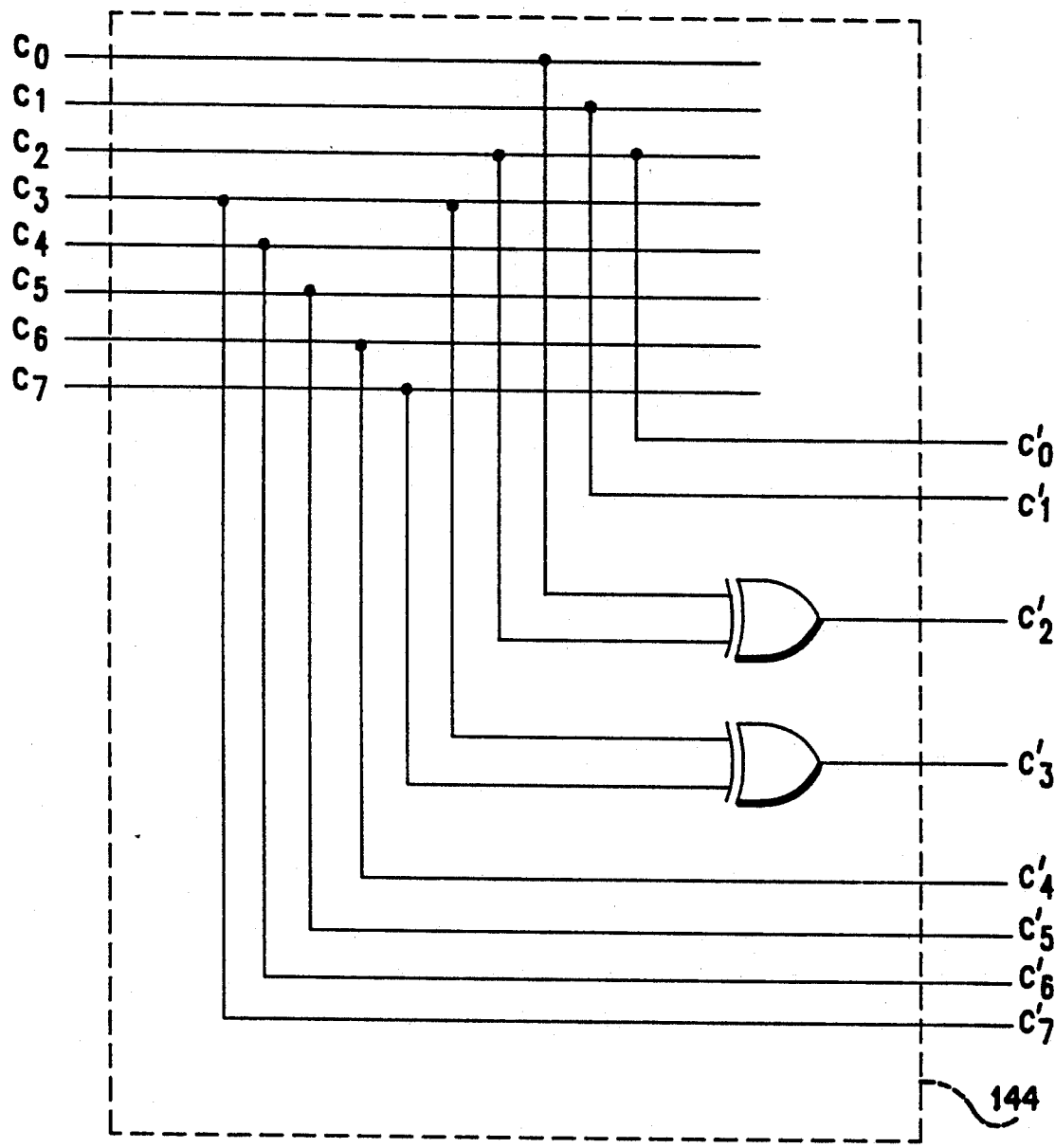
FIG. 7 is a schematic diagram of an output basis change circuit of the multiplier of FIG. 3 for $GF(2^8)$.

The resulting finite field element can be converted from D-basis representation to polynomial basis using a basis conversion circuit 144. In FIG. 7, a basis conversion circuit 144 is shown in greater detail for the GF($2^8$) circuit. The basis conversion circuit 144 implements the logical relationships given below $c_0' = c_2$    (10)
$c_1' = c_1$
$c_2' = c_0 \, XOR \, c_2$
$c_3' = c_3 \, XOR \, c_7$
$c_4' = c_6$
$c_5' = c_5$
$c_6' = c_4$
$c_7' = c_3$.

The circuitry of the invention can be simplified even further when one of the finite field elements is a known constant. For example, when the element b is a constant, the circuitry can be streamlined by particularly adapting the computing circuits 43 to performing its functions on the constant element b. Wherever a component of the constant finite field element is zero, a multiplication modulo-q operation is not required. Therefore, the router 42 need not deliver a component from the variable finite field element that corresponds to a zero component in the constant finite field element. Thus each group of single-component signal lines in the router 42 has at most m single-component signal lines. Each computing circuit 43 receives one of the groups of at most m signal lines and is particularly adapted to multiply each non-zero component of the constant finite field element by the corresponding signal from the variable finite field element. Each computing circuit further adds modulo-q the products obtained by that computing circuit in the multiplications so as to output a single component of the resultant finite field element. Because circuitry is not required where the constant finite field element has a zero component, the amount of circuitry can be reduced in this special case where b is a constant.

Figure 8:
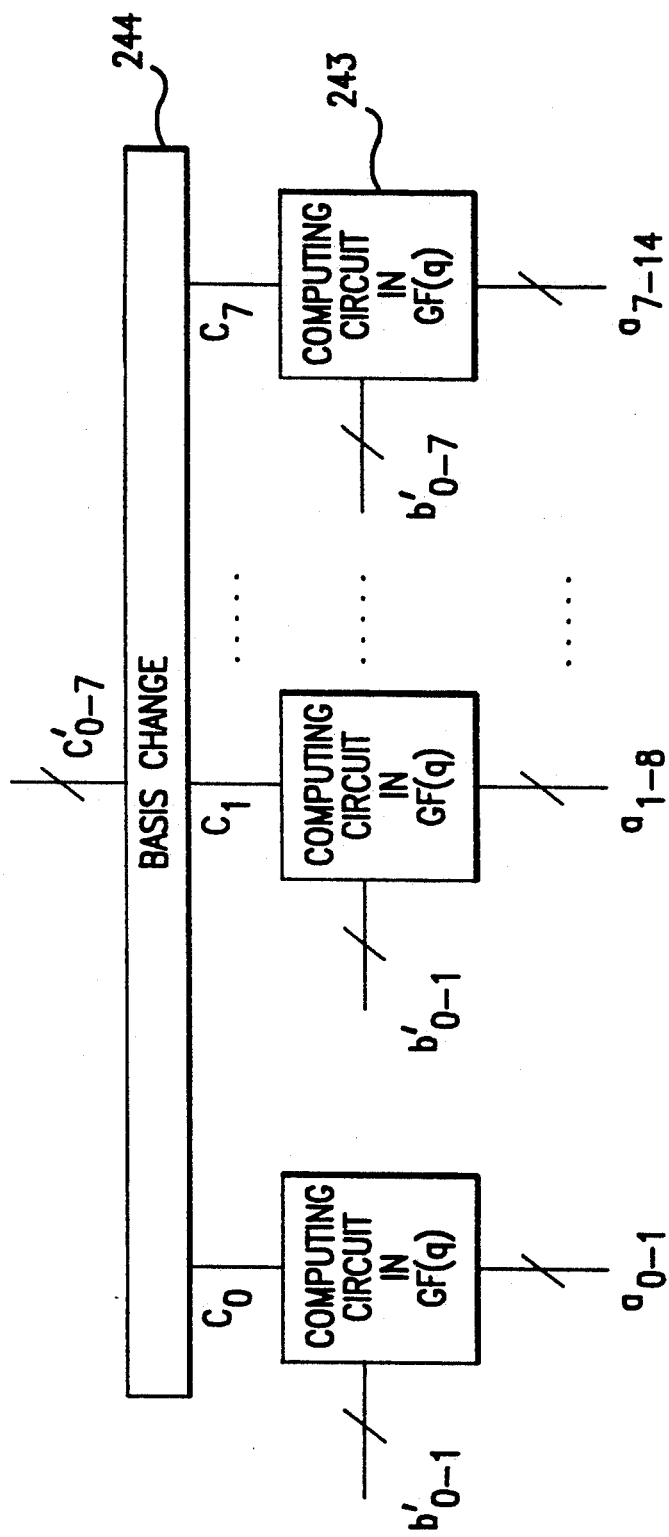
FIG. 8 is a schematic block diagram of a finite field parallel multiplier of the present invention when one of the finite fields is a constant.

An alternate method of multiplying a constant element by an arbitrary finite field element is to provide the constant as input a as shown in FIG. 8. In this arrangement, there is no need for the basis change circuit 40, the processing circuit 41 nor the router 42. The finite field parallel multiplier begins with m computing circuits 243. The constant finite field element a is used to provide a set of $2m-1$ components $a_0$ through $a_{2m-2}$ corresponding to a basis change and precomputation of the additional $m-1$ components as in the generic finite field parallel multiplier. Each of the m computing circuits receives the variable finite field element b. The number of input lines to one of the computing circuits 243 from the variable finite field element b may be reduced by eliminating those that correspond to zero values from the constant multiplier set of $2m-1$ components. The computing circuits are particularly designed to produce intermediate result signals corresponding to multiplying modulo-q each of the non-zero components in a subset of m consecutive components from the set of $2m-1$ components $a_0$ through $a_{2m-2}$. Since the zero components need not be multiplied, each computing circuit operates on at most m components out of m components taken in order from the set of $2m-1$ components originated by constant finite field element a. Consequently, only at most m intermediate result signals are generated by each computing circuit corresponding to the non-zero components in the subset of m consecutive components from the complete set of $2m-1$ ordered components. The at most m intermediate result signals obtained in a computing circuit are added modulo-q to output a single signal representing a component of a resultant finite field element. The finite field element b is provided in standard basis to the computing circuits. Each computing circuit 243 produces a single-bit output line $c_i$ representative of the resultant finite field element. The m components of c may then be provided to the basis change circuit 244 for providing the resultant finite field element in the standard basis.

This constant finite field multiplier saves significant circuitry as compared to a generic finite-field multiplier.

The present invention advantageously reduces the amount of circuitry required in a finite field multiplier that generates a result in one clock cycle. The reduction in total circuitry required by the present invention is particularly advantageous for a Reed-Solomon decoder. Such a decoder makes use of numerous finite field parallel multipliers such that any reduction in circuitry will over the entire system provide significant cost savings.

Of course, it should be understood that various changes and modifications to the preferred embodiment described above will be apparent to those skilled in the art. For example, the finite field parallel multiplier of the present invention may be implemented for any value of q or m. These and other changes can be made without departing from the spirit and scope of the invention and without diminishing its attendant advantages. It is therefore intended that such changes and modifications be covered by the following claims.

What is claimed is:

1. A finite field parallel multiplier in $GF(q^m)$ for multiplying a first finite field element by a second finite field element comprising:

means for receiving the second finite field element having m components in a first basis;

means for receiving the first finite field element having m components in a second basis;

means for using the first finite field element to generate, in parallel, $m-1$ components;

a router connected to receive the m components of the first finite field element and the generated $m-1$ components so as to route said components into m groups of m single-component signal lines each; and m computing means each connected to receive one of the groups of m single-component signal lines and all of the components of the second finite field element, each of said m computing means multiplying modulo-q each of the components of the second finite field element by a different one of the single components from said one of the groups of m single component signal lines to produce m results and adding modulo-q said m results so that each of said m computing means outputs a single component.

2. The finite field parallel multiplier of claim 1 wherein said using means comprises a circuit for making linear combinations of the m components of the first finite field element.

3. The finite field parallel multiplier of claim 1, herein said using means comprises a circuit for generating $m-1$ components corresponding to components defined by the following formula:

a) multiplying modulo-q each coefficient of a primitive polynomial of $GF(q^m)$ by a corresponding component in said first finite field element to produce m products;

b) adding modulo-q all of said m products to generate one of said $m-1$ components;

c) deleting a least significant component of said first finite field element, shifting the remaining components of said first finite field element down one location and inserting the generated one of said $m-1$ components into a most significant location to produce a new finite field element;

d) replacing the first finite field element with the new finite field element; and e) repeating steps a, b, c and d until all $m-1$ components have been generated.

4. The finite field parallel multiplier of claim 1, wherein said using means comprises a circuit for generating $m-1$ components corresponding to components defined by the following formula:

a) multiplying modulo-q each component of said first finite field element by a corresponding coefficient in a primitive polynomial of $GF(q^m)$ to produce m products;

b) adding modulo-q all of said m products to generate one of said $m-1$ components;

c) deleting a most significant coefficient of said primitive polynomial of $GF(q^m)$, shifting the remaining coefficients of said primitive polynomial of $GF(q^m)$ up one location and inserting a zero into at least significant location to produce a new polynomial;

d) multiplying modulo-q each coefficient of said primitive polynomial of $GF(q^m)$ by the deleted most significant coefficient to produce a second polynomial;

e) adding modulo-q each coefficient of said new polynomial to a correspondingly located coefficient in the second polynomial to produce a third polynomial;

f) replacing the coefficients of said primitive polynomial of $GF(q^m)$ in steps (a) and (c) but not (d) with the coefficients of the third polynomial; and g) repeating steps a,b,c,d,e and f until all $m-1$ components have been generated.

5. The finite field parallel multiplier of claim 1, wherein q equals 2 and wherein said m computing means comprise AND gates for multiplying and exclusive OR gates for adding.

6. The finite field parallel multiplier of claim 1, further comprising means for receiving each of the single components output from said m computing means and for transforming said components from the second basis into a third basis.

7. The finite field parallel multiplier of claim 6 wherein the third basis is identical to the first basis.

8. The finite field parallel multiplier of claim 1 further comprising means for receiving the first finite field element having m components in a first basis and means for transforming the m components of the first finite field element from the first basis into the second basis so that the m components of the first finite field element in the second basis are provided to said means for receiving the first finite field element.

9. A finite field parallel multiplier for multiplying a variable finite field element by a constant finite field element in $GF(q^m)$ comprising:

first means for receiving the variable finite field element having m components;

means for using the variable finite field element to generate, in parallel, $m-1$ components;

a router connected to receive the m components of the variable finite field element and the generated $m-1$ components so as to route said components into m groups of at most m single-component signal lines each; and m computing means each connected to receive one of the groups of at most m single-component signal lines, each of said m computing means multiplying modulo-q each non-zero component of the constant finite field element by a corresponding one of the single components from said one of the groups of at most m single component signal lines to produce a result for each multiplication and said each of said m computing means adding modulo-q all of the multiplication results obtained therein so that each of said m computing means outputs a single component.

10. The finite field parallel multiplier of claim 9 wherein said using means comprises a circuit for making linear combinations of the m components of the variable finite field element.

11. The finite field parallel multiplier of claim 9, wherein said using means comprises a circuit for generating $m-1$ components corresponding to components defined by the following formula:
 a) multiplying modulo-q each coefficient of a primitive polynomial of $GF(q^m)$ by a corresponding component in the variable finite field element to produce m products;
 b) adding modulo-q all of said m products to generate one of said $m-1$ components;
 c) deleting a least significant component of the variable finite field element, shifting the remaining components of the variable finite field element down one location and inserting the generated one of said $m-1$ components into a most significant location to produce a new finite field element;
 d) replacing the variable finite field element with the new finite field element; and
 e) repeating steps a, b, c and d until all $m-1$ components have been generated.

12. The finite field parallel multiplier of claim 9, wherein said using means comprises a circuit for generating $m-1$ components that correspond to components defined by the following formula:
 a) multiplying modulo-q each component of the variable finite field element by a corresponding coefficient in a primitive polynomial of $GF(q^m)$ to produce m products;
 b) adding modulo-q all of said m products to generate one of said $m-1$ components;
 c) deleting a most significant coefficient of said primitive polynomial of $GF(q^m)$, shifting the remaining coefficients of said primitive polynomial of $GF(q^m)$ up one location and inserting a zero into a least significant location to produce a new polynomial;
 d) multiplying modulo-q each coefficient of said primitive polynomial of $GF(q^m)$ by the deleted most significant coefficient to produce a second polynomial;
 e) adding modulo-q each coefficient of said new polynomial to a correspondingly located coefficient in the second polynomial to produce a third polynomial;
 f) replacing said primitive polynomial of $GF(q^m)$ in steps (a) and (c) but not (d) with the third polynomial; and
 g) repeating steps a,b,c,d,e and f until all $m-1$ components have been generated.

13. The finite field parallel multiplier of claim 9, wherein q equals 2 and wherein said m computing means comprise AND gates for multiplying and exclusive OR gates for adding.

14. The finite field parallel multiplier of claim 9 further comprising second means for receiving the variable finite field element having m components in a first basis and means for transforming the m components of the variable finite field element from the first basis into a second basis and for providing the m components of the variable finite field element in the second basis to said first means for receiving the variable finite field element having m components.

15. The finite field parallel multiplier of claim 14, further comprising means for receiving each of the single components output from said m computing means and for transforming said components into a third basis.

16. The finite field parallel multiplier of claim 15 wherein said third basis is identical to said first basis.

17. A finite field parallel multiplier for multiplying a variable finite field element by a constant finite field element in $GF(q^m)$ which defines a constant set of $2m-1$ ordered signals, said finite field parallel multiplier comprising:
 means for receiving m signals representing m components of the variable finite field element; and
 m computing means, each connected to receive all of the m signals from said receiving means, each of said m computing means producing at most m intermediate result signals corresponding to multiplying modulo-q each non-zero component of a subset of m components taken in order from said constant set of $2m-1$ ordered signals by a corresponding signal from said receiving means and said each of said m computing means adding modulo-q the at most m intermediate result signals obtained therein so that each of said m computing means outputs a single signal representing a component of a resultant finite field element.

18. The finite field parallel multiplier of claim 17, further comprising means for receiving each of the single signals output from said m computing means and for transforming said signals into a representation of a finite field element in standard basis.

19. The finite field parallel multiplier of claim 17, wherein q equals 2 and wherein said m computing means comprise AND gates for multiplying and exclusive OR gates for adding.

20. A finite field parallel multiplier comprising:
 means for receiving a first finite field element having m components in a first basis, where m is an integer;
 means for transforming the first finite field element from the first basis into a D-basis;
 means for generating, in parallel, $m-1$ components based upon the first finite field element in the D-basis;
 means for routing the m components of the first finite field element in the D-basis and the generated $m-1$ components into m groups of m single-component signal lines each;
 means for receiving a second finite field element having m components in the first basis;
 m computing means, each connected to receive one of the groups of m single-component signal lines and all of the components of the second finite field element, each of said computing means multiplying modulo-q each of the components of the second finite field element by a different one of the single components from said one of the groups of m single-component signal lines to produce m results and said each of said computing means adding modulo-q all of said m results obtained therein so that each of said m computing means outputs a single component; and means for transforming the m single components from said m computing means from the D-basis into the first basis.

21. The finite field parallel multiplier of claim 20 wherein said generating means comprises a circuit for making linear combinations of the m components of the first finite field element in the D-basis.

22. The finite field parallel multiplier of claim 20, wherein said generating means comprises a circuit for generating $m-1$ components corresponding to components defined by the following formula:
   a) multiplying modulo-q each coefficient of a primitive polynomial of $GF(q^m)$ by a correspondingly located component in said first finite field element to produce m products;
   b) adding modulo-q all of said m products to generate one of said $m-1$ components;
   c) deleting a least significant component of said first finite field element, shifting the remaining components of said first finite field element down one location and inserting the generated one of said $m-1$ components into a most significant location to produce a new finite field element;
   d) replacing the first finite field element with the new finite field element; and
   e) repeating steps a,b,c and d until all $m-1$ components have been generated.

23. The finite field parallel multiplier of claim 20, wherein said generating means comprises a circuit for generating $m-1$ components corresponding to components defined by the following formula:
   a) multiplying modulo-q each component of said first finite field element by a corresponding coefficient in a primitive polynomial of $GF(q^m)$ to produce m products;
   b) adding modulo-q all of said m products to generate one of said $m-1$ components;
   c) deleting a most significant coefficient of said primitive polynomial of $GF(q^m)$, shifting the remaining coefficients of said primitive polynomial of $GF(q^m)$ up one location and inserting a zero into a least significant location to produce a new polynomial;
   d) multiplying modulo-q each coefficient of said primitive polynomial of $GF(q^m)$ by the deleted most significant coefficient to produce a second polynomial;
   e) adding modulo-q each coefficient of said new polynomial to a correspondingly located coefficient in the second polynomial to produce a third polynomial;
   f) replacing the primitive polynomial of $GF(q^m)$ in steps (a) and (c) but not (d) with the third polynomial; and
   g) repeating steps a, b, c, d, e and f until all $m-1$ components have been generated.

24. The finite field parallel multiplier of claim 20, wherein q equals 2 and wherein said m computing means comprise AND gates for multiplying and exclusive OR gates for adding.

25. A finite field parallel multiplier for elements in $GF(2^8)$ comprising:
   means for receiving a first finite field element having 8 bits in a standard basis including $a'_0, a'_1, a'_2, a'_3, a'_4, a'_5, a'_6, a'_7$;
   means for transforming the first finite field element from the standard basis into 8 bits in a D-basis including $a_0, a_1, a_2, a_3, a_4, a_5, a_6, a_7$;
   a plurality of exclusive OR gates arranged so as to generate an additional seven bits including $a_8, a_9, a_{10}, a_{11}, a_{12}, a_{13}, a_{14}$ based upon the first finite field element in the D-basis;
   means for receiving a second finite field element having 8 bits including $b_1, b_2, b_3, b_4, b_5, b_6, b_7, b_8$ in the standard basis;
   eight computing means each including eight AND gates each connected to receive one of the bits from said second finite field element and a corresponding bit from an ordered subset of the bits comprised of said first finite field element in the D-basis followed by said additional seven bits and means for exclusive ORing the outputs from said AND gates in said each of said computing means so as to each output a single bit; and
   means for transforming the 8 single bits from said computing means from the D-basis into 8 bits including $c'_0, c'_1, c'_2, c'_3, c'_4, c'_5, c'_6, c'_7$ in the standard basis.

26. The finite field parallel multiplier of claim 25 wherein said means for transforming the first finite field element comprises an exclusive OR gate for receiving $a'_0$ and $a'_2$ to produce $a_0$, an exclusive OR gate for receiving $a'_3$ and $a'_7$ to produce $a_7$ and signal lines for making $a'_1$ into $a_1$, $a'_0$ into $a_2$, $a'_7$ into $a_3$, $a'_6$ into $a_4$, $a'_5$ into $a_5$, and $a'_4$ into $a_6$.

27. The finite field parallel multiplier of claim 25 wherein said means for transforming the 8 single bits from said computing means comprises an exclusive OR gate for receiving a first bit of the 8 single bits and a third bit of the 8 single bits to produce $c'_2$, an exclusive OR gate for receiving a fourth bit of the 8 single bits and an eighth bit of the 8 single bits to produce $c'_3$, and signal lines for making the third bit of the 8 single bits into $c'_0$, a second bit of the 8 single bits into $c'_1$, a seventh bit of the 8 single bits into $c'_4$, a sixth bit of the 8 single bits into $c'_5$, a fifth bit of the 8 single bits into $c'_6$ and the fourth bit of the 8 single bits into $c'_7$.

28. The finite field parallel multiplier of claim 25 wherein said plurality of exclusive OR gates comprise an XOR gate for receiving $a_0$ and $a_2$ to produce a first intermediate bit, an XOR gate for receiving $a_3$ and $a_4$ to produce a second intermediate bit, an XOR gate for receiving $a_1$ and $a_5$ to produce a third intermediate bit, an XOR gate for receiving $a_2$ and $a_4$ to produce a fourth intermediate bit, an XOR gate for receiving $a_5$ and $a_6$ to produce a fifth intermediate bit, an XOR gate for receiving $a_3$ and $a_7$ to produce a sixth intermediate bit, an XOR gate for receiving $a_1$ and $a_7$ to produce a seventh intermediate bit, an XOR gate for receiving $a_0$ and $a_1$ to produce an eighth intermediate bit, an XOR gate for receiving $a_6$ and the sixth intermediate bit to produce a ninth intermediate bit, an XOR gate for receiving the first intermediate bit and the second intermediate bit to produce $a_8$, an XOR gate for receiving the second intermediate bit and the third intermediate bit to produce $a_9$, an XOR gate for receiving the fourth intermediate bit and the fifth intermediate bit to produce $a_{10}$, an XOR gate for receiving the fifth intermediate bit and the sixth intermediate bit to produce $a_{11}$, an XOR gate for receiving the first intermediate bit and the ninth intermediate bit to produce $a_{12}$, an XOR gate for receiving the seventh intermediate bit and the first intermediate bit to produce $a_{13}$ and an XOR gate for receiving the eighth intermediate bit and $a_4$ to produce $a_{14}$.

29. A Reed-Solomon decoder comprising:
   means for receiving Reed-Solomon coded messages;

syndrome means for syndrome computation of Reed-Solomon coded received messages to produce a syndrome polynomial;

key equation solver means for receiving said syndrome polynomial and generating an error locator polynomial and an error evaluator polynomial, said key equation solver means including a plurality of finite field parallel multipliers in $GF(q^m)$ for multiplying a first finite field element by a second finite field element, each of said finite field parallel multipliers comprising:

means for receiving the second finite field element having m components in a first basis;

means for receiving the first finite field element having m components in a second basis;

means for using the first finite field element to generate, in parallel, $m-1$ components;

a router connected to receive the m components of the first finite field element and the generated $m-1$ components so as to route said components into m groups of m single-component signal lines each; and m computing means each connected to receive one of the groups of m single-component signal lines and all of the components of the second finite field element, each of said m computing means multiplying modulo-q each of the components of the second finite field element by a different one of the single components from said one of the groups of m single component signal lines to produce m results and adding modulo-q said m results so that each of said m computing means outputs a single component;

delay means for time delaying said Reed-Solomon coded received messages;

polynomial evaluation means, connected to receive said error locator polynomial and said error evaluator polynomial from said key equation solver means for calculating results based on said error locator polynomial and said error evaluation polynomial, said polynomial evaluation means including a plurality of said finite field parallel multipliers; and means connected to receive the delayed received messages from said delay means, for correcting errors in the delayed received messages based on the results of the error evaluation means and for outputting corrected Reed-Solomon coded messages.

* * * * *